UNITED STATES PATENT OFFICE.

WILLIAM EDWARD FEROE, OF TIVOLI, NEW YORK.

PROCESS OF MANUFACTURING BEER, SIRUP, &c.

SPECIFICATION forming part of Letters Patent No. 303,142, dated August 5, 1884.

Application filed September 15, 1883. (No specimens.)

*To all whom it may concern:*

Be it known that I, WILLIAM EDWARD FEROE, a resident of Tivoli, in the county of Dutchess and State of New York, have invented an Improved Process of Manufacturing Beer, Sirup, and Distilled Liquors, of which the following is a full, clear, and exact description.

This invention has for its object so to treat cornmeal that the fatty acids and cellulose may be entirely separated from the starch, the soluble albumenoids, and the salts, dextrine, and free sugar, allowing the last-mentioned constituents to be utilized in the absence of the objectionable fatty acids and cellulose, for the purposes of making beer and distilled liquors, or merely as sirups.

Heretofore in manipulating cornmeal as a substitute for malt or grape sugar in making beer or distilled liquors it was a matter of extreme difficulty to exclude fatty acids and gluten and to prevent the coagulation of the albumenoids; and yet it is well known that unless these difficulties are overcome the use of corn for the stated purposes is practically impossible, because the diastase of the malt, which must be added to the products of the corn, acts as a solvent upon the fatty acids, thereby producing an objectionable flavor, and also exerts a damaging influence upon fermentation, producing a weak yeast, while for successful brewing a healthy yeast for perfect fermentation is an absolute requirement.

My process is as follows: I first reduce the corn to meal—fine bolted meal being preferable—and then add to every hundred pounds of the meal about thirty gallons of cold water, leaving the meal in the water sufficiently long to thoroughly saturate the meal. By this the particles of the meal become enlarged, because they absorb the water. When I say "cold water," I mean cool water that has not been artificially heated, or, if so, not to an extent sufficient to transform it into warm or hot water. I now add to the saturated meal from one to two per centum, by weight, of malt finely ground, for the sole purpose of liquefying the starch that is contained in the cornmeal. I then apply heat to the said mixture—preferably steam—until the temperature of the mixture is raised to, say, from 100° to 160° Fahrenheit, or thereabout. This heat is kept up for about one hour, and causes the cells of the cornmeal, which contain the starch to be further expanded, and, finally, to burst, and immediately upon the cells bursting the malt will liquefy the starch which is liberated from the cells, yet the heat is not sufficient to cause the fatty acids or the gluten to dissolve, or the albumenoids to coagulate; or, if it were sufficient, there is not enough malt in the mixture to dissolve the fatty acids or the gluten.

Having now produced out of the burst cells of cornmeal the liquefied starch, I next treat the mixture mechanically, so as to separate its liquid constituents from the insoluble remnants. The liquid constituents contain starch and soluble albumenoids, salts, dextrine, and sugar. The insoluble residue contains the fatty acids and the gluten. The separation may best be obtained, either by subjecting the mixture to agitation on a sieve or sieves, and to subsequent pressure between sieves or porous fabrics, or by any other known means of expressing liquids from analogous mixtures. I now heat the liquid constituents that have thus been separated from the solid impurities to a sufficient degree to insure conversion by diastatic action, and then add the remaining necessary quantity of malt, and then proceed in the same manner in which all malt-mash is ordinarily treated in the manufacture of beer or distilled liquors; or the mixture may be concentrated in the usual manner to produce sirup.

I regard it as the principal feature of my invention that the particles of cornmeal are expanded in two stages—that is to say, expanded, first, to an extent by the cool water, whereby they are prepared to be finally burst by heat that does not exceed materially a temperature of 160° Fahrenheit. Without these successive stages of enlargement more heat would be required to cause the bursting of the cells, and as a result the usual objections that have thus far followed the employment of cornmeal for brewing purposes would be met with.

I do not claim anything that is described in United States Patents No. 113,997 and 176,117, nor in English Patent No. 4,751 of 1880.

I claim—

The process herein described of preparing cornmeal for the mash and for the admixture with malt, which consists in first saturating the cornmeal with cool water, then adding malt in the limited proportion stated, then heating the mixture to the limited extent specified, causing the starch-cells to burst, in then separating the liquid constituents from the solids, and then adding the remainder of the mash, as set forth.

WILLIAM EDWARD FEROE.

Witnesses:
 WILLY G. E. SCHULTZ,
 HARRY SMITH.